Nov. 24, 1936.  I. MÜLLER  2,061,917
LIQUID MEASURING APPARATUS
Filed Sept. 12, 1933
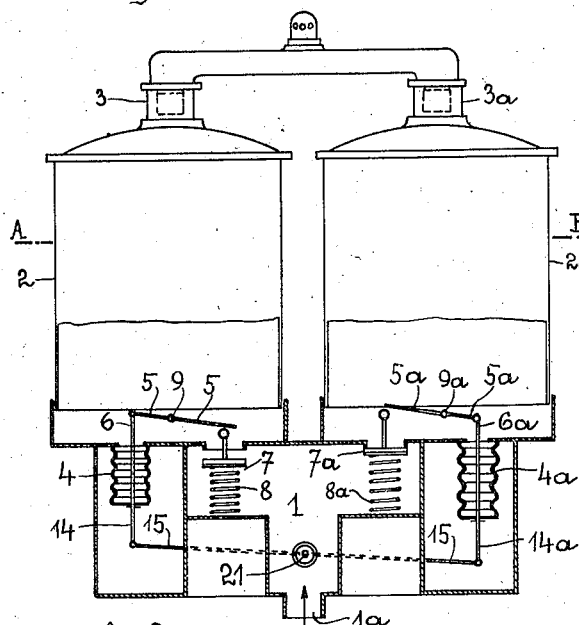
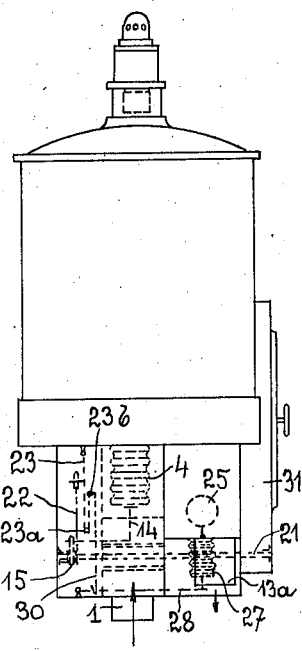
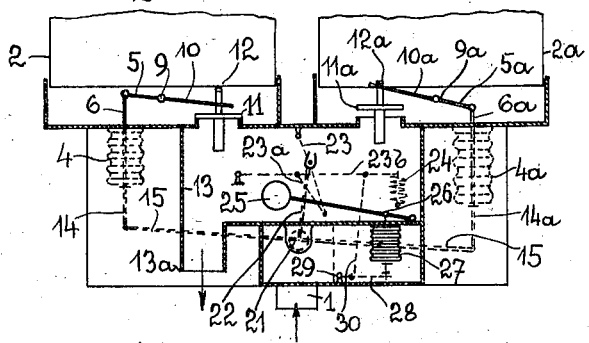
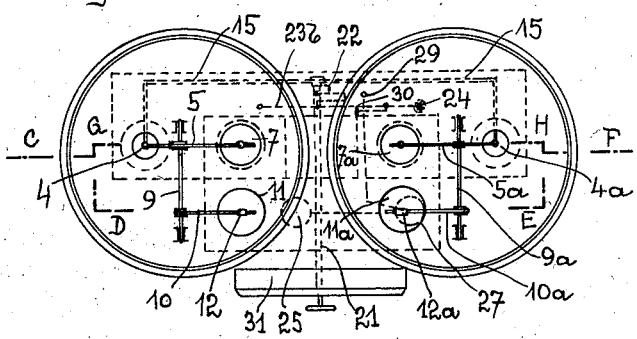
INVENTOR
*Ignaz Müller,*
BY
ATTORNEY Patented Nov. 24, 1936

2,061,917

UNITED STATES PATENT OFFICE 2,061,917

LIQUID MEASURING APPARATUS

Ignaz Müller, Vienna, Austria

Application September 12, 1933, Serial No. 689,088
In Austria September 19, 1932

5 Claims. (Cl. 73—220)

This invention relates to liquid measuring apparatus and has for its object to provide an apparatus which differs from the known measuring apparatus in this, that at least some of the members which are to be controlled in dependence on filling and emptying (outlet, inlet, and the like) are controlled by elastic bodies such as metal bellows forming part of the walls of the measuring devices. A liquid measuring appliance constructed in accordance with the invention has the great advantage over known arrangements in that the inlet and outlet chambers are not connected by an externally situated change-over device, i. e. device for reversing the movements of the inlet and outlet valve control members, but are entirely separated from one another, thus eliminating such members as cocks, pistons and the like, and making it possible for the first time for a liquid measuring vessel to have no stuffing boxes, lubrication or the like.

The arrangement according to the invention may be such that the inlet and the outlet members of one of the measuring vessels have a bellows as a common controlling member, the outflow member being opened during the motion of the bellows corresponding to the closing motion of the inlet member. By the inclusion of an idle path in the control motion of the outlet member i. e., a lost motion mechanism, including a float controlled bellows for actuating a change-over device, provision may easily be made that the outlet member will only commence the opening motion after the inlet member has already closed.

A preferred constructional form of the device is one in which the control of the inlet and outlet members is subjected to a locking action operated by a float or the like, the arrangement being such that the locking action is only released after the measuring vessel has been completely emptied.

My invention contemplates two or more measuring vessels in which an automatic change-over of the measuring vessel just delivering the liquid is effected by the elastic bellows. According to the invention the arrangement is such that the bellows of individual measuring vessels are so interconnected that they assist one another mutually in their effect, the connection between the bellows being suitably established through the intermediary of a control shaft which is subjected to a locking action and which is actuated by the bellows and causes the change-over to the measuring vessel which is delivering the liquid to take place only when the measuring vessel which is already delivering liquid has been completely emptied.

In the arrangement according to the invention the motions of the bellows can also be utilized if desired for driving various arrangements, thus for example for the automatic change-over from one measuring vessel to the other, for actuating a device for overcoming the dead centre position of the change-over device, for operating a counting mechanism and, if required, a registering device and so on.

In the accompanying drawing a constructional example of a twin measuring vessel according to the invention is represented in Fig. 1 in elevation and partly in section on line C—G—H—F of Fig. 4, in Fig. 2 in side elevation, in Fig. 3 in elevation and part section on line C—D—E—F of Fig. 4 and in Fig. 4 in a horizontal section on line A—B of Fig. 1. Fig. 5 illustrates a detail of the float controlled valve.

In Fig. 1 of the drawing $1a$ is the inlet opening common to the two coacting measuring vessels 2 and $2a$, which are provided at the top with float-operated closing valves 3 and $3a$, which, on a measuring vessel becoming completely filled, close it in a known manner to prevent passage of liquid and air out through the top. The inflow valves 7 and $7a$ and the outflow valves 11 and $11a$ are disposed each in an inflow chamber 1 and an outflow chamber 13 respectively common to the two measuring vessels and the control of these valves is effected by bellows, preferably inherently resilient metal bellows 4 and $4a$ respectively, which actuate control levers 5, 10 and $5a$, $10a$ respectively of control shafts 9 and $9a$ respectively for the valves.

Through the pressure each time produced in the full measuring vessel, the elastic bellows 4 and $4a$ situated below the measuring chambers are actuated in such a manner that below the filled measuring vessel, for instance the bellows $4a$ under the vessel $2a$, is always expanded and the lever $5a$ is consequently moved by a pull bar $6a$, whereby the inflow valve $7a$ is pressed on to its seat, preferably with the co-operation of a spring $8a$. At the same time through the motion of the lever $5a$ the control shaft $9a$ is turned, causing the lever $10a$ (Figs. 3 and 4) to be moved and the outflow valve $11a$ to open. The lifting pin $12a$ of the outflow valve $11a$ (Fig. 3) is so adjusted that the outflow valve is only opened when the inflow valve of this measuring vessel is already closed. The liquid of the completely filled measuring vessel can thus be withdrawn through the common outflow opening 13a of the chamber 13.

The bellows 4, 4a of the two measuring vessels are connected together by a member, for instance a two-armed lever 15, in such a manner that while one bellows, for instance 4a, is expanded, the other, 4, remains in the compressed state. Through the expansion of the bellows 4a the beam 15 is therefore at the same time put in motion by means of the pull bar 14a, the other end of which beam is connected to the elastic bellows 4 by means of the pull bar 14. In this state the inflow valve 7 in the other vessel 2 is kept open by the pull bar 6 and the lever 5, while by means of the shaft 9 and the lever 10 (Figs. 3 and 4) the outflow valve 11 is kept closed, so that the measuring vessel 2 can be filled, while the measuring vessel 2a is in the delivery state and vice versa.

The change-over of the two measuring vessels takes place positively at each rocking motion of the beam 15 which is moved by the elastic bellows. On the rocking shaft 21 of the beam 15 a forked lever 22 is fixed, which coacts with a toggle lever 23, 23a which actuates a lever 23b which is under the influence of a spring 24 and through its motion stresses or stretches the spring 24, until the levers 22 and 23 pass their middle position (dead centre position). By this means the stressed spring 24 is released so that it can contract and move the rocking beam 15 into the opposite position.

Furthermore, according to the invention an arrangement is provided for arresting the change-over device until the measuring vessel which for the time being is in the delivery condition has become completely empty. This arrangement is actuated by a float 25 which is mounted in the common outflow chamber 13 (Fig. 3) and influences a valve 26 which is suspended from the float shaft and which may have a tapered or ball shaped body, and which according to the position of the float 25 opens or closes the opening of an elastic bellows 27 mounted exteriorly of the outflow chamber but which communicates with the outflow chamber and is closed to the outside. In the position illustrated in Fig. 3 the outflow liquid which holds the float 25 in the raised position is still in the outflow chamber 13, whereby the liquid which always fills the metal bellows 27 is shut off by the valve 26 and prevents the bellows 27 being compressed. This causes a lever 28 connected to the bellows 27 to be prevented from turning about its rocking axis 29 and consequently also a lever 30 connected to the lever 28, which coacts with the lever 23b of the change-over device (15, 21, 22, 23a, 23b, 24) and keeps the latter arrested until the outflow chamber 13 becomes empty and the float 25 which has consequently sunk or its valve 26 allows the sealing liquid to flow out of the bellows 27 and the latter to become compressed, only after which the change-over device which has up to then been kept arrested by the levers 28 and 30 can complete its motion.

The motions of the bellows may be utilized directly or indirectly for actuating a counting and registering mechanism. Registering mechanism 31 may be driven from shaft 21.

What I claim is:

1. Liquid measuring apparatus having at least two measuring vessels, said vessels being adapted to be alternately filled and emptied, inlet and outlet valves for said vessels positioned in one wall of each vessel, members for controlling the movements of said valves and an elastic body member for each vessel positioned in the same wall as the valves for automatically operating said controlling members, and a rigid member disposed outside the vessels connecting said body members whereby the expansion of one elastic body member causes or assists the contraction of the other elastic body member and vice versa.

2. Liquid measuring apparatus having at least two measuring vessels, said vessels being adapted to be alternately filled and emptied, inlet and outlet valves for said vessels, members for controlling the movements of said valves, an elastic bellows associated with each vessel for automatically operating said controlling members and float controlled means including an elastic bellows associated with the filled vessel for locking the first mentioned elastic bellows against movement until the other vessel is completely emptied.

3. Liquid measuring apparatus having at least two measuring vessels, said vessels being adapted to be alternately filled and emptied, inlet and outlet valves for said vessels, members for controlling the movements of said valves, an elastic bellows associated with each vessel for automatically operating said controlling members, means for locking the elastic bellows associated with the filled vessel against movement until the other vessel is completely emptied and means for releasing said locking means when said other vessel is completely emptied, said latter means including a float influenced by the movement of the liquid, an elastic bellows and a valve in said last mentioned elastic bellows operated by said float.

4. Liquid measuring apparatus having at least two measuring vessels, said vessels having a discharge chamber and being adapted to be alternately filled and emptied, inlet and outlet valves for said vessels, members for controlling the movements of said valves, an elastic bellows associated with each vessel and motivated by the filling and emptying of the vessel, a rigid member connecting said bellows and actuated thereby, said rigid member being operatively connected to said controlling members for actuating the same, another bellows associated with the discharge chamber, a float operated valve controlling the movement of said latter bellows and a member under the influence of said latter bellows for locking said rigid member against movement.

5. Liquid measuring apparatus having at least two measuring vessels with a common outlet chamber, said vessels being adapted to be alternately filled and emptied, inlet and outlet valves for said vessels, mechanism for controlling the movements of said valves including a control shaft, an elastic bellows associated with each vessel for automatically actuating said control shaft, means for locking said control shaft against movement until one of the vessels is completely emptied, said means including a bellows, and a float controlled by the rise and fall of the liquid in the outlet chamber influencing the operation of said locking means.

IGNAZ MÜLLER.